(12) United States Patent  (10) Patent No.: US 6,543,896 B1
Huang  (45) Date of Patent: Apr. 8, 2003

(54) EYEGLASS TEMPLES HAVING ANGLE ADJUSTABLE ARRANGEMENTS

(76) Inventor: Hsiu-Chuan Huang, 72 Lane 23 Shianbei St., Tainan City (TW)

( * ) Notice: Subject to any disclaimer, the term of this patent is extended or adjusted under 35 U.S.C. 154(b) by 0 days.

(21) Appl. No.: 10/235,294

(22) Filed: Sep. 5, 2002

(51) Int. Cl.⁷ .................................................. G02C 5/14
(52) U.S. Cl. ...................................... 351/120; 351/111
(58) Field of Search .............................. 351/120, 111, 351/116, 118, 119, 140, 153, 154, 41, 158; 16/228

(56) References Cited

U.S. PATENT DOCUMENTS 6,364,479 B1 * 4/2002 Wu ............................. 351/120
6,474,813 B1 * 11/2002 Yeh ............................. 351/120

* cited by examiner

Primary Examiner—Hung Xuan Dang
(74) Attorney, Agent, or Firm—Alan Kamrath; Rider, Bennett, Egan & Arundel, LLP

(57) ABSTRACT

An arrangement for angularly adjusting an eyeglass temple comprises a first connecting mechanism releasably connected to a frame, the first connecting mechanism comprising a lateral hole having a staged bore and a rear engagement section including inner outer projections; and a second connecting mechanism mounted on a front end of the temple, the second connecting mechanism comprising an inner flexible staged shaft secured in the lateral hole, a slit recessed into the staged shaft, an arcuate section adjacent the staged shaft, the arcuate section being urged by the outer projection, and a series of serrations recessed into the arcuate section with the inner projection interfitted into a space between adjacent ones of the series of serrations. An up or down movement of the temple about the frame causes the inner projection to switch a securing from one of the series of serrations to the other.

1 Claim, 4 Drawing Sheets

EYEGLASS TEMPLES HAVING ANGLE ADJUSTABLE ARRANGEMENTS

FIELD OF THE INVENTION

The present invention relates to temples of a pair of eyeglasses having improved angle adjustable arrangements.

BACKGROUND OF THE INVENTION

Angularly adjustable temples for a pair of eyeglasses are well known. Typically, prior art patents are more complicated and more expensive to manufacture than the eyeglass temples provided in this application. In contrast, the invention is seeking to provide an economical, reliable means for user to adjust angles of the temples about eyeglass frame.

SUMMARY OF THE INVENTION

It is therefore an object of the present invention to provide an arrangement for angularly adjusting each one of two temples for a pair of eyeglasses comprising a first connecting mechanism releasably connected to a frame, the first connecting mechanism comprising a lateral hole having a staged bore and a rear engagement section including an inner projection and an outer projection; and a second connecting mechanism mounted on a front end of the temple, the second connecting mechanism comprising an inner flexible staged shaft secured in the lateral hole, a slit recessed into the staged shaft, an arcuate section adjacent the staged shaft, the arcuate section being urged by the outer projection, and a series of serrations recessed into the arcuate section with the inner projection interfitted into a space between adjacent ones of the series of serrations. Thus, an up or down movement of the temple respect to the frame causes the inner projection to switch a securing from one of the series of serrations to the other.

The above and other objects, features and advantages of the present invention will become apparent from the following detailed description taken with the accompanying drawings.

DETAILED DESCRIPTION OF THE PREFERRED EMBODIMENTS

Figure 1:
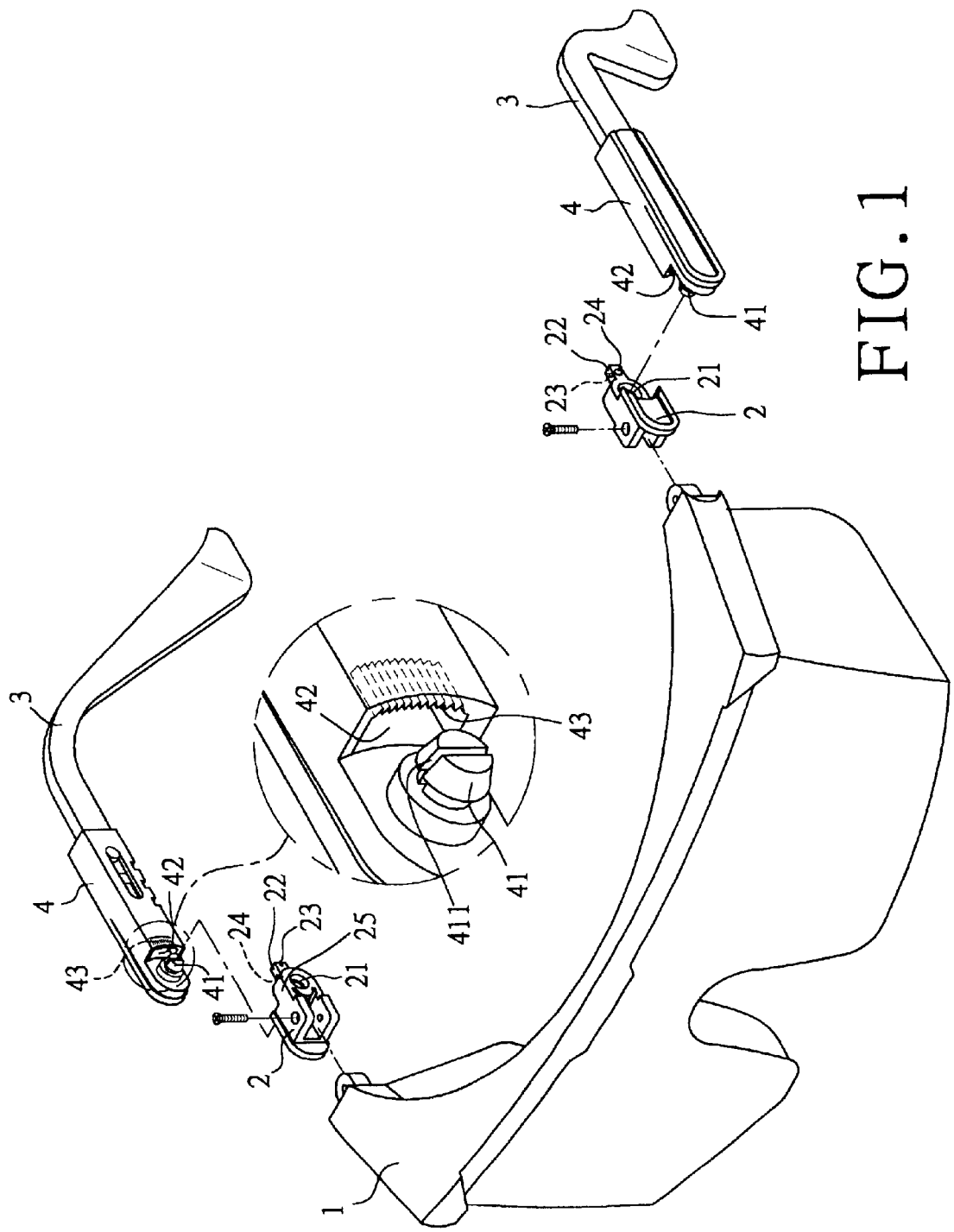
FIG. 1 is an exploded view of a preferred embodiment of a pair of eyeglasses according to the invention with a portion greatly enlarged for clarity.

Referring to FIG. 1, there is shown a pair of eyeglasses constructed in accordance with the invention comprising a frame 1 with two lens fitted thereon, two temples 3, two first connecting mechanisms 2 connectable to the frame 1, and two second connecting mechanisms 4 mounted on the front ends of the temples 3. Each of the first and the second connecting mechanisms 2 and 4 will now be described in detail below.

The first connecting mechanism 2 comprises a lateral hole 21 having a staged bore, a rear engagement section 22 including an inner projection 23 and an outer projection 24, and two recessed corners 25 on a top and a bottom of the lateral hole 21 respectively. The second connecting mechanism 4 comprises, at its front end facing the first connecting mechanism 2, an inner flexible staged shaft 41, a slit 411 recessed into the staged shaft 41, an arcuate section 42 adjacent the staged shaft 41, and a series of serrations 43 recessed into the arcuate section 42.

Figure 2:
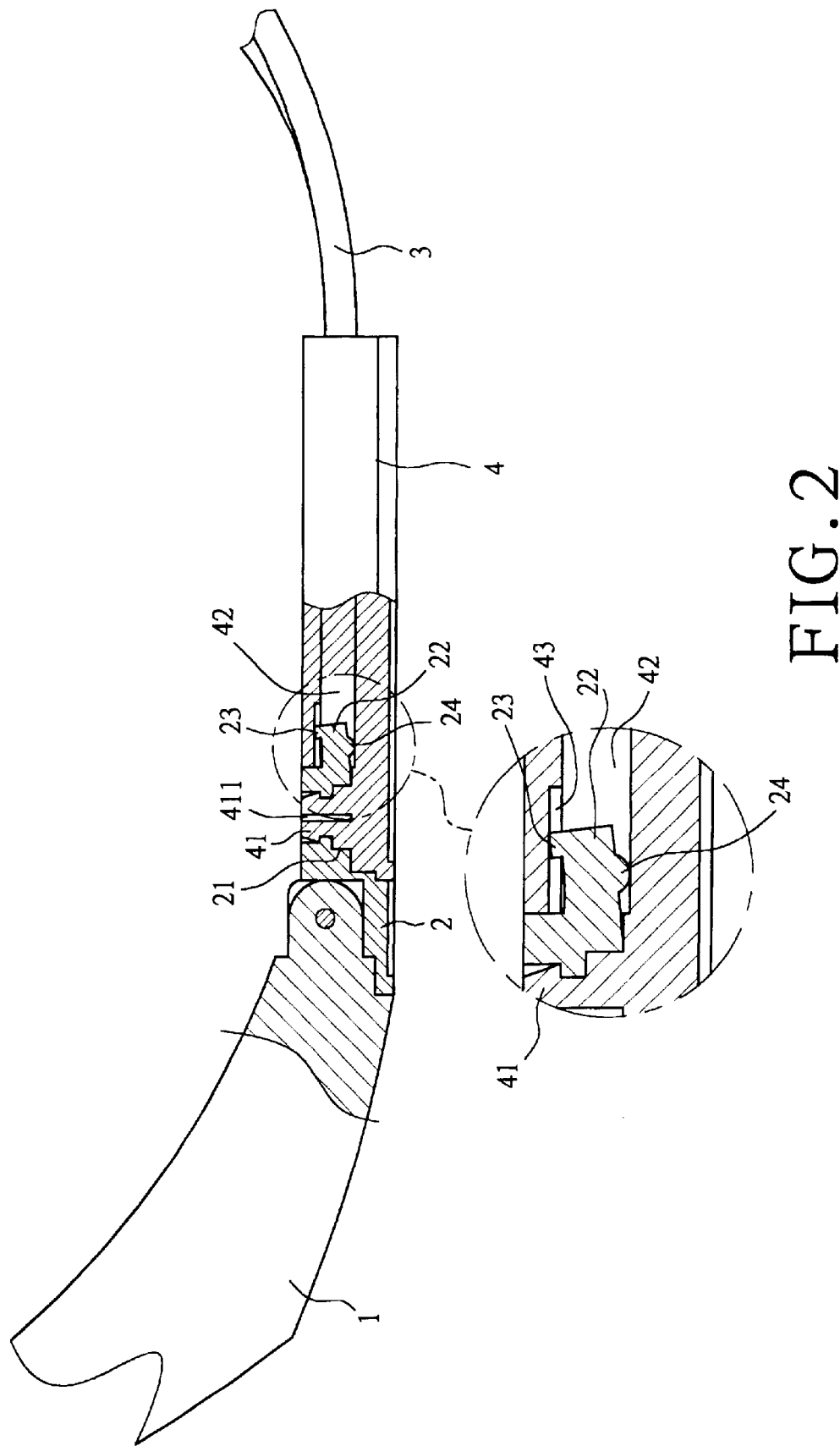
FIG. 2 is a cross-sectional view of the assembled temple, first connecting mechanism, second connecting mechanism, and frame with a portion greatly enlarged for clarity.

Referring to FIG. 2, an assembly of the invention will now be described in detail below. First threadedly secure the first connecting mechanisms 2 to the frame 1. Next, insert the staged shaft 41 into the lateral hole 21 for tightly coupling. Such insertion is made possible by slightly compressing the slit 411 from both sides due to the flexibility of the staged shaft 41. Also, the inner projection 23 interfits into a space between adjacent ones of the series of serrations 43 and the outer projection 24 is urged against the arcuate section 42.

Figure 3:
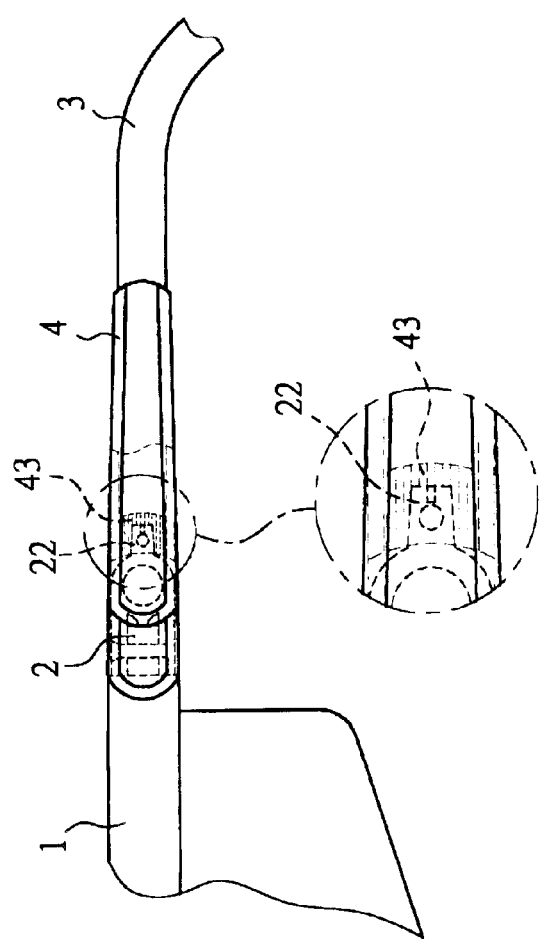
FIG. 3 is another cross-sectional view of the assembled temple, first connecting mechanism, second connecting mechanism, and frame with a portion greatly enlarged for clarity.
Figure 4:
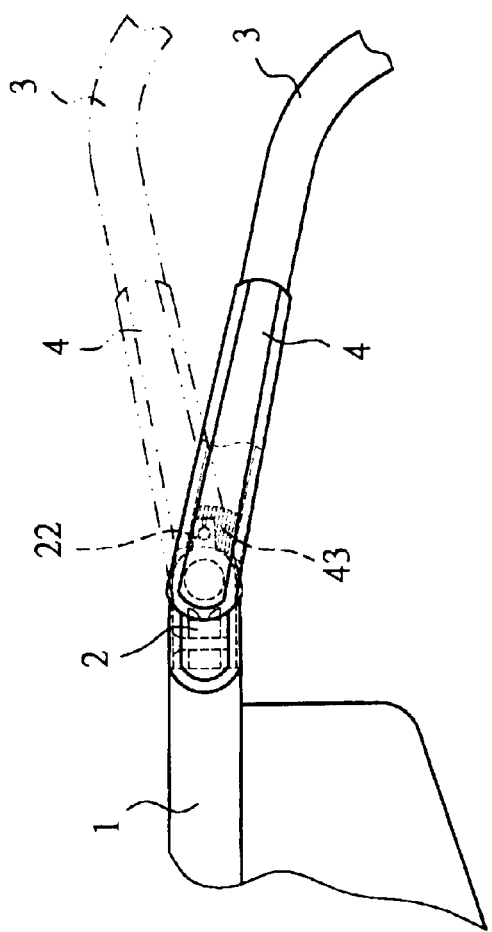
FIG. 4 is a view similar to FIG. 3 showing an angle adjustment of temple.
Figure 5:
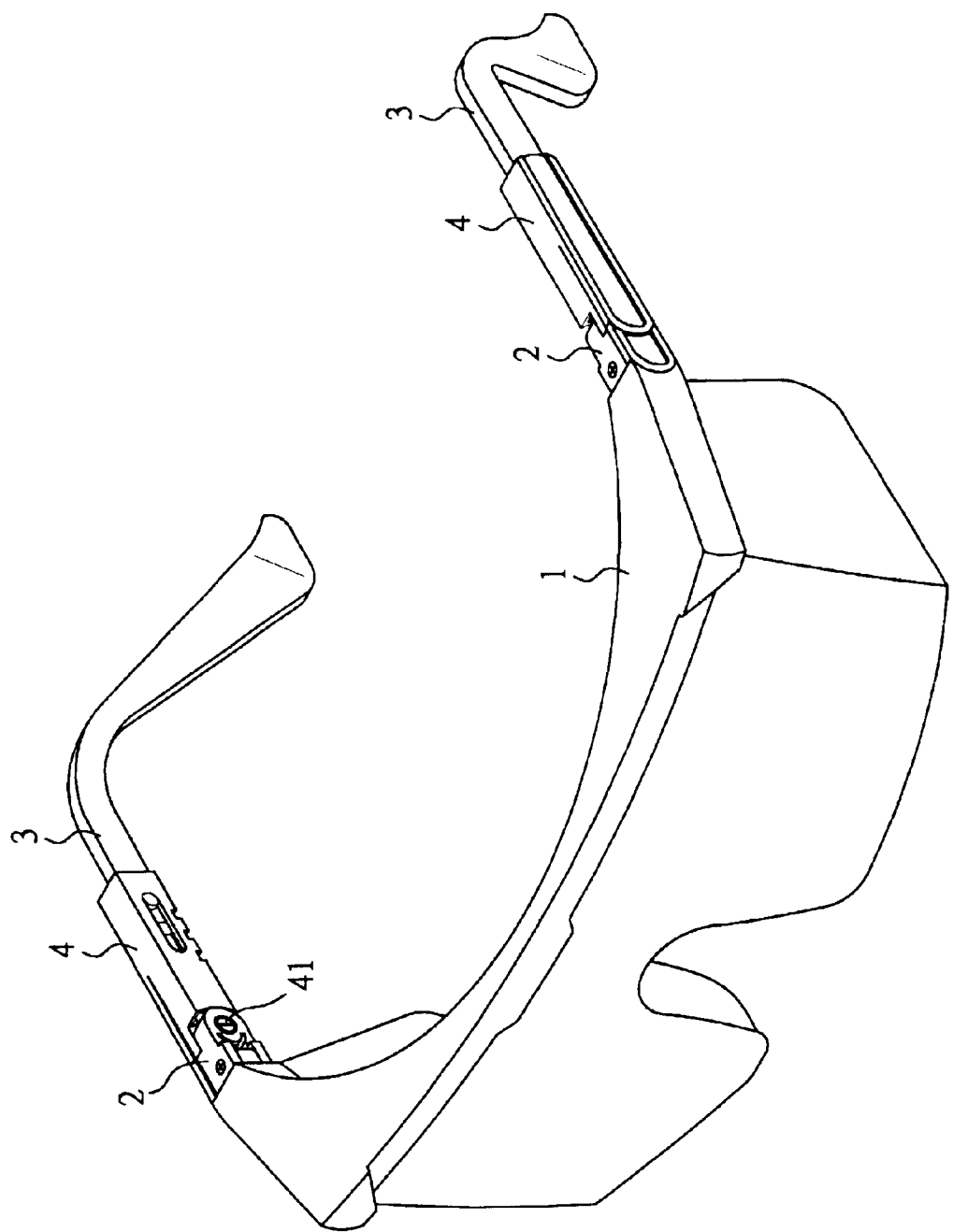
FIG. 5 is a perspective view of the eyeglasses of the invention.

Referring to FIGS. 3 and 4, an operation of the invention will now be described in detail below. An eyeglass wearer can adjust an angle of the temple 3 respect to the frame 1 by moving upwardly or downwardly the temple 3 in which the inner projection 23 moves from one of the series of serrations 43 to another. As a result, the temple 3 is secured at this position since in addition to the engagement of the inner projection 23 with one of the series of serrations 43, as stated above the outer projection 24 is always urged against the arcuate section 42. A perspective view of the eyeglasses of the invention is shown in FIG. 5.

While the invention has been described by means of specific embodiments, numerous modifications and variations could be made thereto by those skilled in the art without departing from the scope and spirit of the invention set forth in the claims.

What is claimed is:

1. An arrangement for angularly adjusting each one of two temples for a pair of eyeglasses comprising:

a first connecting mechanism releasably connected to a frame, the first connecting mechanism comprising a lateral hole having a staged bore and a rear engagement section including an inner projection and an outer projection; and a second connecting mechanism mounted on a front end of the temple, the second connecting mechanism comprising an inner flexible staged shaft secured in the lateral hole, a slit recessed into the staged shaft, an arcuate section adjacent the staged shaft, the arcuate section being urged by the outer projection, and a series of serrations recessed into the arcuate section with the inner projection interfitted into a space between adjacent ones of the series of serrations;

wherein an up or down movement of the temple respect to the frame causes the inner projection to switch a securing from one of the series of serrations to the other.

* * * * *